US008813063B2

(12) United States Patent
Uthe

(10) Patent No.: US 8,813,063 B2
(45) Date of Patent: Aug. 19, 2014

(54) VERIFICATION OF SUCCESSFUL INSTALLATION OF COMPUTER SOFTWARE

(75) Inventor: Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1668 days.

(21) Appl. No.: 11/567,450

(22) Filed: Dec. 6, 2006

(65) Prior Publication Data
US 2008/0141240 A1 Jun. 12, 2008

(51) Int. Cl.
*G06F 9/44* (2006.01)
*G06F 9/45* (2006.01)

(52) U.S. Cl.
USPC ............................ 717/174; 717/127; 717/131

(58) Field of Classification Search
None
See application file for complete search history.

(56) References Cited

U.S. PATENT DOCUMENTS

| | | | | |
|---|---|---|---|---|
| 6,006,035 A * | 12/1999 | Nabahi | | 717/175 |
| 6,126,329 A * | 10/2000 | Bennett et al. | | 717/127 |
| 6,367,077 B1 * | 4/2002 | Brodersen et al. | | 717/170 |
| 6,453,468 B1 * | 9/2002 | D'Souza | | 717/168 |
| 6,519,765 B1 * | 2/2003 | Kawahito et al. | | 717/127 |
| 6,934,935 B1 * | 8/2005 | Bennett et al. | | 717/127 |
| 6,941,545 B1 * | 9/2005 | Reese et al. | | 717/131 |
| 6,957,422 B2 * | 10/2005 | Hunt | | 717/127 |
| 7,013,456 B1 * | 3/2006 | Van Dyke et al. | | 717/131 |
| 7,020,875 B2 * | 3/2006 | Zweifel et al. | | 717/168 |
| 7,076,778 B2 * | 7/2006 | Brodersen et al. | | 717/170 |
| 7,178,144 B2 * | 2/2007 | Melchione et al. | | 717/172 |
| 7,185,335 B2 * | 2/2007 | Hind et al. | | 717/176 |
| 7,216,343 B2 * | 5/2007 | Das et al. | | 717/168 |
| 7,424,719 B2 * | 9/2008 | Duplichan | | 717/174 |
| 7,461,374 B1 * | 12/2008 | Balint et al. | | 717/174 |
| 7,496,913 B2 * | 2/2009 | Hayes et al. | | 717/174 |
| 7,505,872 B2 * | 3/2009 | Keller et al. | | 702/186 |
| 7,546,598 B2 * | 6/2009 | Blumenthal et al. | | 717/127 |
| 7,774,772 B2 * | 8/2010 | Tal et al. | | 717/172 |
| 7,788,536 B1 * | 8/2010 | Qureshi et al. | | 714/38.14 |
| 7,831,412 B1 * | 11/2010 | Sobel et al. | | 702/186 |

(Continued)

FOREIGN PATENT DOCUMENTS

GB EP 1 096 406 A2 * 10/2000 .............. G06F 17/60

OTHER PUBLICATIONS

Liba Svobodova, "Computer Performance Measurement and Evaluation Methods: Analysis and Applications", Elsevier, 1978. p. 15, 21, 23, 75, 76, 115.*

(Continued)

*Primary Examiner* — Xi D Chen
(74) *Attorney, Agent, or Firm* — Schmeiser, Olsen & Watts, LLP; Arthur J. Samodovitz

(57) ABSTRACT

A computerized method, program product, system, and service to verify installation of computer software onto an endpoint machine. The software to be installed is evaluated to determine what operating parameters of the endpoint machine may be affected by the software deployment, installation, and execution. Acceptable ranges of these operating parameters are included with the list of potentially affected parameters, distributed with the software module or sent as a separate script. Metrics are collected during the software installation, e.g., before deployment, after deployment but before installation, after installation, during execution, etc. How and when these operating parameters are monitored can be programmable. If and when the operating parameters extend beyond the acceptable ranges, a message that the software was not successfully installed is generated. The endpoint machine can be rolled back to a prior configuration.

9 Claims, 4 Drawing Sheets

(56) References Cited

U.S. PATENT DOCUMENTS

| | | | |
|---|---|---|---|
| 7,849,460 B1* | 12/2010 | Martin et al. | 717/174 |
| 7,870,550 B1* | 1/2011 | Qureshi et al. | 717/174 |
| 7,966,278 B1* | 6/2011 | Satish | 706/52 |
| 7,987,460 B2* | 7/2011 | Lo et al. | 717/174 |
| 8,255,902 B1* | 8/2012 | Satish | 717/174 |
| 8,341,617 B2* | 12/2012 | Bunn | 717/174 |
| 8,392,168 B2* | 3/2013 | Samper et al. | 717/131 |
| 8,443,341 B2* | 5/2013 | Berg et al. | 717/131 |
| 8,539,455 B2* | 9/2013 | Berg et al. | 717/131 |
| 2002/0091807 A1* | 7/2002 | Goodman | 709/221 |
| 2002/0147966 A1* | 10/2002 | Frazier | 717/127 |
| 2003/0159137 A1* | 8/2003 | Drake et al. | 717/172 |
| 2003/0167373 A1* | 9/2003 | Winters et al. | 711/103 |
| 2004/0060035 A1* | 3/2004 | Ustaris | 717/100 |
| 2004/0060044 A1* | 3/2004 | Das et al. | 717/171 |
| 2004/0205167 A1* | 10/2004 | Grumann | 709/220 |
| 2005/0055689 A1* | 3/2005 | Abfalter et al. | 717/174 |
| 2005/0198640 A1* | 9/2005 | Uthe | 718/104 |
| 2005/0257199 A1* | 11/2005 | Johansson et al. | 717/126 |
| 2006/0064486 A1* | 3/2006 | Baron et al. | 709/224 |
| 2006/0070129 A1* | 3/2006 | Sobel et al. | 726/23 |
| 2006/0080656 A1* | 4/2006 | Cain et al. | 717/174 |
| 2006/0080658 A1* | 4/2006 | Marion et al. | 717/177 |
| 2006/0253848 A1* | 11/2006 | Mathieu et al. | 717/168 |
| 2006/0259904 A1* | 11/2006 | Celli et al. | 717/174 |
| 2007/0016888 A1* | 1/2007 | Webb | 717/174 |
| 2007/0038983 A1* | 2/2007 | Stienhans | 717/127 |
| 2007/0157195 A1* | 7/2007 | Gaa-Frost et al. | 717/174 |
| 2007/0239841 A1* | 10/2007 | Lehrman | 709/217 |
| 2008/0098387 A1* | 4/2008 | Lo et al. | 717/174 |
| 2010/0211934 A1* | 8/2010 | Simons et al. | 717/174 |

OTHER PUBLICATIONS

Domenico Ferrari, "Computer Systems PerformanceEvaluation", Prentice-Hall, 1978, p. 335-339.*

Hoopes, Triantis, "Efficiency Performance, Control Charts, and Process Improvement: Complementary Measurement and Evaluation"; 2001, IEEE; [retrieved on Feb. 19, 2013]; Retrieved from Internet <URL:http://ieeexplore.ieee.org/stamp/stamp.jsp?tp=&arnumber=922481>; pp. 239-253.*

Hellerstein, et al., "An Approach ot Selecting Metrics for Detecting Performance Problems in Information Systems", 1996 IEEE; [retrieved on Jun. 19, 2013]; Retrieved from Internet <URL:http://ieeexplore.ieee.org/stamp/stamp.jsp?tp=&arnumber=534144>;pp. 30-39.*

Garrison, et al., "Success Factors for Deploying Cound"; 2012 Communication s of the ACM; [retrieved on Feb. 3, 2014]; Retreieved from Internet <URL:http://dl.acm.org/citation.cfm?id=233066>; pp. 62-68.*

Mahimkar, et al., "Rapid Dection of Maintenance Induced Changes in Service Performance"; 2011 ACM; [retrieved on Feb. 3, 2014]; Retreieved from Internet <URL:http://dl.acm.org/citation.cfm?id=2079296>; pp. 1-12.*

Pasala, et al., "Selection of Regression Test Suite to Validate Software Applications upon Deployment of Upgrades"; 2008, IEEE;[retrieved on Feb. 3, 2014]; Retreived from Internet <URL:http://ieeexplore.ieee.org/stamp/stamp.jsp?tp=&arnumber=4483201>; pp. 130-138.*

Tian, "Quality-Evaluation Models and Measurements"; 2004 IEEE; [retrieved on Feb. 3, 2014]; Retreieved from Internet <URL:http://ieeexplore.ieee.org/stamp/stamp.jsp?tp=&arnumber=1293078>; pp. 84=-91.*

\* cited by examiner

US 8,813,063 B2

VERIFICATION OF SUCCESSFUL INSTALLATION OF COMPUTER SOFTWARE

BACKGROUND OF THE INVENTION

Field of the Invention

This invention relates to the field of computer software and more particularly relates to verifying that software has been successfully installed across a broadband bus or wireless connection of a computer communications network.

There is a phenomenal growth in the number and variety of information technology (IT) assets and users so that modern businesses have extensive critical hardware and software assets. It is vitally important to quantify the number, kind, and location of all these assets. Distributing software and security patches, managing inventory and ensuring compliance across a business's complex heterogeneous environment in a secure, reliable fashion has become a monumental task. It's difficult to keep up with IT resources that change rapidly and are distributed across a geographically dispersed workforce. It is difficult to keep up with security patches that come out frequently and must be installed quickly across the enterprise to protect the IT environment. It is difficult to keep up with frequent changes among employees and their roles that demand different types of IT resources to enable them to perform their jobs. There is also a rapid growth in the number of mobile and pervasive devices such as laptops, PDAs, and mobile phones that need to be managed. Addressing these challenges with manual processes is often inefficient, error-prone, and costly. Many companies need a way to automate scheduling, submitting, monitoring and controlling software and patch distribution.

Few businesses, especially small businesses, have efficient and accurate methods for identifying, tracking and reporting on hardware and software assets. As a result, the businesses are exposed to security vulnerabilities because the configurations of their systems do not align with minimal security standards. Even in large businesses using distributed software, security patches are often inconsistently or slowly distributed. When new applications or updates are available, the processes of identifying which machines need prerequisites may be done manually and on a machine-by-machine basis. It wastes time of the IT staff, if the business even has an IT staff and delays the delivery of useful software tools to employees. IBM's TIVOLI® products, MICROSOFT® System Management Server, ALTIRIS®, OPSWARE, etc. are all products that can distribute software to tens of thousands of different computers and systems in one operation.

IBM's TIVOLI® products include, inter alia, a Configuration Manager, a Provisioning Manager for Operating System (OS) Deployment, a Provisioning Manager Express for Software Distribution, and a Change and Configuration Management Database (CCMDB), have the capability to distribute or deploy software to multiple locations. Some TIVOLI® products may enforce adherence to a company's policies by changing system configurations as needed to ensure compliance. Some of the products may also automatically obtain, package, distribute, install and manage operating systems, software applications, software patches needed by client systems in distributed customer environments. There is an IBM TIVOLI® product than can also create and manage operating system cloned or scripted image installs so that each file only needs to be captured and stored once rather than a full image. As a result, the process for capturing the image is faster, the number of images that you need to manage is fewer and deployment and re-imaging new systems is faster than alternative methods. Capabilities of the IBM's TIVOLI® products help administrators create and deliver the software packages to individual laptops, desktops and servers that are in need of software updates. There is yet another IBM TIVOLI® product that manages change and configuration database of the entire network to store deep, standardized data on configurations and change histories to help integrate people, processes, information and technology. All these products help implement IT service management initiatives and enable the IT team to predict the impact of changes, and can standardize the enforcement of internal and regulatory policies. By integrating, automating and optimizing data, workflows and policies with IBM's TIVOLI® products, a business's ongoing management of its IT infrastructure can be aligned with its priorities, can simplify architectural complexity, and reduce incident and problem management costs. IBM's TIVOLI® products may discover the installed applications, the deep configuration details, the existing security of devices on the network, and then integrate these with other internal and external data sources. Discovery includes a variety of computer systems, network devices, applications, middleware, and databases. After deployment, the computer systems across the enterprise are automatically scanned and hardware and software configuration information is collected. Some of these products can tell a user if installation of the operating system or software failed for only a limited number of reasons, mainly relating to hardware concerns, e.g., the network was not available or a system was otherwise not reachable, a disk was full, etc.

Even though, however, some of the software installation products may indicate that deployment and installation of the software was successful, these products do not indicate if a given system is left in a runnable state. Bad configuration files may have dropped the server to connect to network or to the endpoint computers, updating some shared files may have corrupted other software that runs on the system, the newer version of the software may perform but has performance problems, e.g., is a bad fix or has a bad configuration, etc. Presently, these commercial products don't have a solution for detecting if a system was adversely affect by the deployed software even though it may otherwise have been reported as successfully installed. It may be possible to run a "post-install script" to try and detect problems but a new script must be written for each specific software application or even different versions of the same software application. Such a specific script is constructed to test for a very specific set of error conditions and usually does not apply to other software being deployed. Users, however, still write these scripts because, until now, there is nothing better. What users also do in practice is examine a sampling of systems directly in person or via a remote desktop to see that they are executing properly. Larger environments may update over one hundred thousand computer systems at a time and even with a low error rate of one percent, there would still be a thousand systems encountering some kind of problem. Thus, these very specific and narrow approaches allow many errors go unnoticed until an end user tries to use the updated system. Being able to detect deployment and installation problems automatically would drastically reduce the time it takes to return to an operational state.

For monitoring networked computer systems in order to determine their health and to trigger automation and/or notification to operators when it appears systems are encountering problems, there is an IBM TIVOLI® Monitoring suite of products and other products such as BMC® PATROL®, HEWLITT PACKARD® OPENVIEW, MICROSOFT® Operations Manager (MOM). Many metrics such as CPU usage, memory, disk utilization, etc. can be monitored. Monitoring software and predetermined operating parameters and their metrics, moreover, are available for specific applications such as database and other applications including DB2®, web application servers (WAS), LOTUS NOTES®, ORACLE®, etc., examples of which include messages processed per minute, the depth of request queues, the number of open connections, etc. But software may still be installed that doesn't affect these particular software products or doesn't affect the monitored parameters. There is still a need to determine if deployment and installation of software across a network may adversely affect the performance of an machine using the new software.

SUMMARY OF THE INVENTION

These needs and other that will become apparent are solved by a method to deploy software, the method comprising the steps of determining at least one operating parameter that may be affected by deployment, installation, or execution of a software module; predicting acceptable metrics of the at least one operating parameter; and including the determination of the at least one operating parameter against the acceptable metrics with the software module to determine if an installation error has occurred.

The method to deploy software may further comprise the steps of selecting at least one endpoint machine upon which to deploy the software module; reviewing the at least one operating parameter and its respective acceptable metrics; collecting actual metrics of the at least one operating parameter from the endpoint machine at various stages of the software installation, i.e., "before" metrics before deploying the software, "after deployment" metrics, "before installation" metrics, "during installation" metrics, "after installation" metrics, and "execution" metrics of the at least one operating parameter on the endpoint machine(s). It is further contemplated that a user may change the operating parameters and/or the acceptable metrics of the monitored parameters.

The method of the invention further contemplates comparing the metrics at any one of the software installation stages with metrics from any other one of the software installation stages. If the metrics are deemed beyond acceptable or outside the threshold ranges, then certain actions may take place: the endpoint machine may be marked has having an unsuccessful software installation, the endpoint machine may be rolled back to a previous configuration. etc.

The invention may also be considered a computer program product in a computer-readable medium comprising a computer usable tangible storage device having computer usable program code, wherein the computer usable program code, when loaded into the internal memory of a processing device, causes the processing device to encode suggested parameters that may be affected by the computer usable program code into the program code; and encode suggested thresholds of the affected parameters. A separate computer program product causes the endpoint machine to acquire metrics of at least one operating parameter during one or more of the plurality of software stages: "before" deployment of the computer usable program code to the endpoint machine; "after deployment" of the computer usable program code on the endpoint machine; "before installation" of the computer usable code on the endpoint machine, "during installation" of the computer usable program code on the endpoint machine, "after installation" of the computer usable program code on the endpoint machine; "during execution" of the computer usable program code on the endpoint machine. Yet, another separate module of the computer program product above may cause a processing device to compare metrics of the at least one operating parameter acquired during one or more of the plurality of software stages on the endpoint machine and to determine if the at least one operating parameter is beyond an acceptable threshold during any of the plurality of software stages. In this manner, a metric such as CPU utilization can be monitored before deployment and compared after installation when the system returns to "during execution." A variance beyond a given threshold is an indication that the installation encountered a problem which negatively impacts the system upon which the software was installed.

The invention may also be considered a software communication system, comprising a selection module to select any of a plurality of parameters and their respective thresholds that may be affected by the installation of a software module on an endpoint machine; a distribution module to deploy the software module to the endpoint machine wherein the distributed software module further comprising instructions to collect metrics of the selected ones of the plurality of parameters during any of the following stages of software installation: before deployment of the software module to the endpoint machine, after deployment of the software module to the endpoint machine, after installation of the software module on the endpoint machine, during execution of the software module on the endpoint machine; and a monitoring module to compare the collected metrics of the selected ones of the plurality of parameters during any of the stages of software installation.

Still another embodiment of the invention is a service for determining if software has been successfully installed on an endpoint machine, the service comprising determining potentially affected operating parameters that may be affected by the installation of the software on the endpoint machine; determining threshold ranges of each of the potentially affected operating parameters; and including a list of the potentially affected operating parameters and their respective threshold ranges with the software. There may also be another service for determining if software has been successfully installed on an endpoint machine, the service comprising collecting metrics of any of a plurality of potentially affected operating parameters of the endpoint machine at any of a plurality of software installation stages. There may still yet be another service that compares the collected metrics at any of the plurality of software installation stages to determine if any of the plurality of operating parameters has been adversely impacted by the software module.

Preferably the invention may be embodied in a variety of IBM TIVOLI® products. First, software distribution products may be modified to set the operating parameters to be monitored and their ranges of acceptable values beyond which installation may be deemed problematic. Second, metrics of the operating parameters should be collected during at least two stages of the software installation: before deployment and during execution. Monitoring during other stages of software installation may be programmed. Also programmable will be the amount of time and when to collect metrics on the endpoint machine, their acceptable tolerance for change in the metrics across the stages, as well as what action to take when an error is observed. For example, the installed software may be automatically uninstalled if the endpoint machine is severely impacted. Reports will be automatically generated so that IT specialists can be aware of the unsuccessful installation.

DETAILED DESCRIPTION OF THE INVENTION

Figure 1:
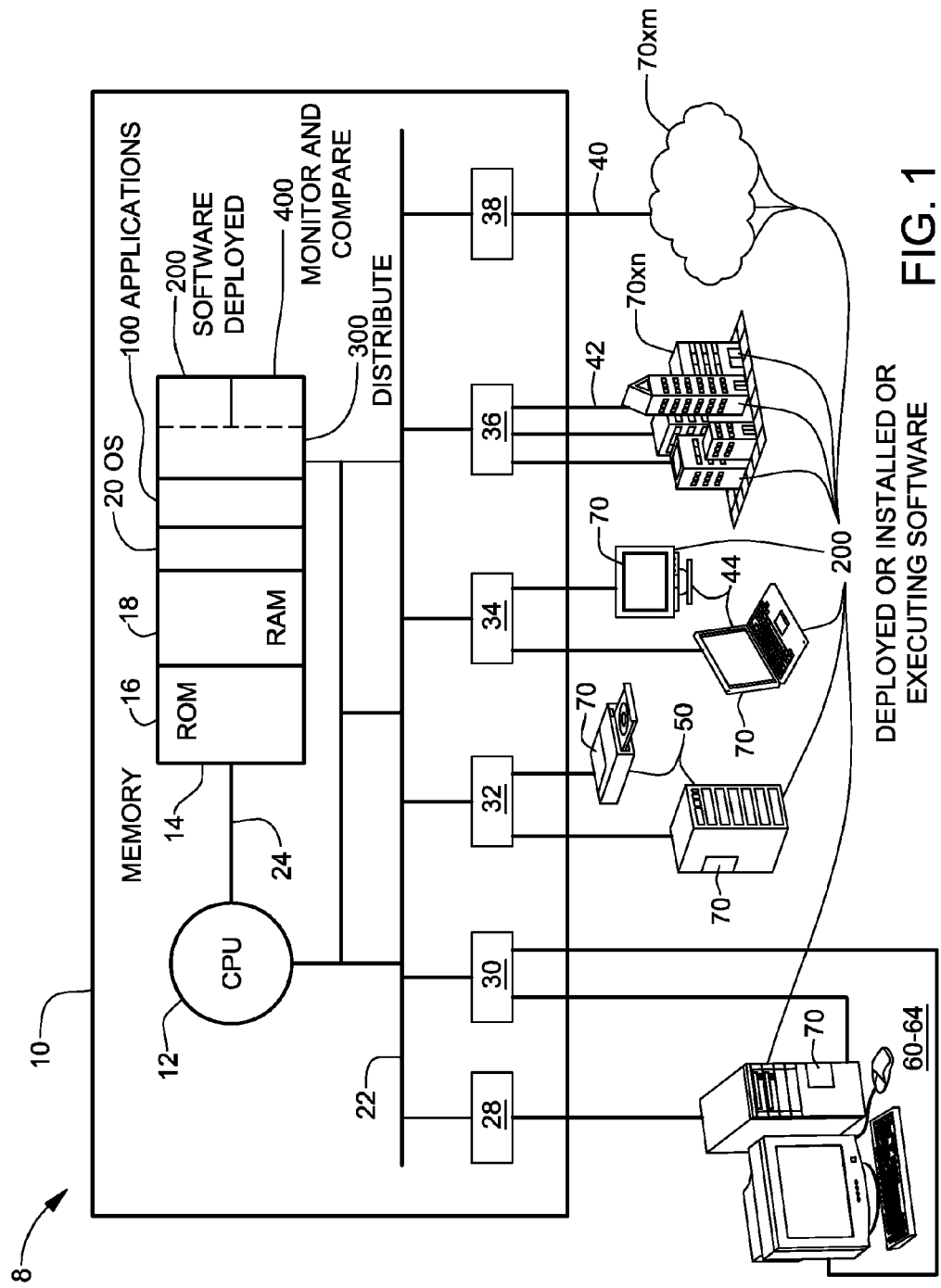
FIG. 1 is a simplified block diagram of a data processing network and endpoint machines for deployment, monitoring, installation, and execution of a software module in accordance with an embodiment of the invention.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, a computer program product and a service to deploy software and to monitor the execution of the software once it is installed on the various endpoint computers. Accordingly, the present invention may take the form of an entirely hardware embodiment, an entirely software embodiment, or an embodiment combining software and hardware aspects. Furthermore, the present invention may take the form of a computer program product on a computer-usable tangible storage device having computer-usable program code embodied on the device. Any suitable computer readable tangible storage device may be utilized including hard disks, CD-ROMs, optical storage devices, or magnetic storage devices.

Computer program source code of the deployed software having an inventory of affected performance parameters and of a monitoring program to monitor and store the metrics of the executing performance parameters both before and after installation of the deployed programs in accordance with a preferred mode described herein may be written in programming languages such as C, COBOL, FORTRAN, LISP, JAVA, SMALLTALK or C++. Object code of the deployed software module having the inventory of affected performance parameters and of the monitoring module to monitor and compare the metrics of the executing performance parameters both before and after installation of the deployed software module may execute entirely on one or more servers, such as a deployment server, a monitoring server that could be the same as or different than the deployment server, as a stand-alone software package, partly on multiple servers or partly on a remote endpoint computer or entirely on the remote endpoint computer. In the latter scenario, the remote endpoint computer may be connected to the deployment server and the monitoring server through a local area network (LAN) or a wide area network (WAN), or the connection may be made to an external computer via the Internet using an Internet Service Provider.

The deployed software module having an inventory of affected performance parameters and the monitoring module to monitor and compare the metrics of the executing performance parameters of the deployed module both before and after installation is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions for the deployed software module having a suggested inventory of affected performance parameters and the monitoring module to collect and compare the metrics of the executing performance parameters of the deployed module both before and after installation may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a high-level block diagram of a computer network system 8 consistent with an embodiment of the invention is shown. Computer network system 8 preferably comprises a number of secure networked computers 10, each of which may have a central processing unit (CPU) 12, memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 1, it should be understood that computer systems having multiple CPUs could be used. CPU 12 is capable of executing an operating system 20 and a myriad of applications 100 including the deployed and installed software having an inventory of affected performance parameters 200, the monitor and compare software module 400 to collect and compare the metrics of the executing performance parameters of the deployed module 200 both before and after installation and a distribution or deployment module 300 to distribute or deploy software. CPU 12 is also capable of generating the computer program or the instructions embodying the deployed software module 200 having an inventory of affected performance parameters and the monitor and compare software module 400 to collect and compare the metrics of the executing performance parameters of the deployed software module 200 before and after installation. CPU 12 is also capable of receiving and transmitting the program instructions embodying the deployed software module 200 having an inventory of affected performance parameters and the monitor and compare software module 400, and is capable of storing the deployed software module 200, the monitor and compare module 400, and the metrics of the parameters both before and after installation and execution as described herein. Communications bus 22 supports transfer of data, commands and other information between different devices, and while shown in simplified form as a single bus, it is typically structured as multiple buses including an internal bus 24 which may connect the CPU 12 directly with memory 14.

Memory 14 comprises a read only memory (ROM) 16 and a random-access memory (RAM) 18 for storing the operating system 20, a distribution module 300 that deploys and transmits the deployed software module 200, the deployed software module 200 itself, and the monitor and compare module 400 and other data and programs. Typically, those portions or programs, routines, modules of the operating system 20 necessary to "boot up" are stored in ROM 16. RAM 18 typically stores programs and data that will be erased when the computer turns off. Memory 14 is shown conceptually as a single monolithic entity but it is well known that memory is often arranged in a hierarchy of caches and other memory devices, some or all of which may be integrated into the same semiconductor substrate as the CPU 12. RAM 18 devices comprises the main storage of computer, as well as any supplemental levels of memory, e.g., cache memories, nonvolatile or backup memories, programmable or flash memories, other read-only memories, etc. In addition, memory 14 may be considered to include memory storage physically located elsewhere in computer, e.g., a cache memory in a processor or other storage capacity used as a virtual memory, e.g., as stored on a mass storage device 50 or on another computer coupled to computer via network.

Operating system 20 and the deploying, deployed and monitoring modules 300, 200, 400 and other applications 100 reside in memory 14. Operating system 20 provides, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems 20 and other various modules of the invention 200,300 and other applications, components, programs, objects, modules, etc., 100, 400 may also execute on one or more processors in another computer coupled to computer 10 via a network 40, 42, e.g., in a distributed or client-server computing environment, whereby the processing required to implement the functions of a computer program may be allocated to multiple computers 10 over a network 40, 42. Typically, there may be one computer server 10 that is a deployment server having both the module 300 that will transmit and distribute the deployed software module 200. There may be another computer server 10 that is a monitoring server having the monitor and compare software module 400 that collects, monitors, and compares the metrics of the deployed software 200 before and after installation and execution on endpoint computers 10. These two servers, the deployment server and the monitoring server, however, may actually be the same server or computer but in large software enterprises, they are most likely two different computer servers. It is presumed that a preferred embodiment of the invention, moreover, requires that the software module 200 having the list of affected parameters be distributed to many, perhaps tens of thousands, multiple computers 10 over a network 40, 42.

In general, the modules 200, 300, 400 execute within the CPU 12 to implement the embodiments of the invention, whether implemented as part of an operating system or a specific application, component, program, object, module or sequence of instructions may be referred to herein as computer programs or simply programs. The modules 200, 300, 400 typically comprise one or more instructions that are resident at various times in various memory and storage in a device and that, when read and executed by one or more processors in the processing device 10, cause that device 10 to perform the steps necessary to execute steps or elements embodying the various aspects of the invention. As mentioned, there may be at least three different modules: first, the actual deployed software 200 having the list or inventory of parameters; second, a distribution module 300 within a distribution server computer 10 that distributes the actual deployed software module 200 to and installed on at least one, most likely thousands, endpoint computers 10; and third, a metrics comparison software module 400 installed on a monitoring server 10 to receive and compare the metrics from the deployed software module 200 to determine if the execution parameters are outside the threshold of an acceptable range. The distribution module 300 is preferably one or more of IBM's TIVOLI® products, whereas the monitor and compare module 400 may be code installed modifying the IBM TIVOLI® Monitoring (ITM) environment or other monitoring software products It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct software developer input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital video disk (DVD) drive, etc., and/or a tape drive, among others. The deployed software module 200 or the collected and compared metrics may be stored on these mass storage devices of different computers 10 that are located through the internet 40, a WAN 42, and other connected machines 42. One of skill in the art will further anticipate that the interfaces 28-38 may also be wireless.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Any of the computers or devices, 60-64, 50, 44 or those connected through networks 40, 42, will have a receiving and monitoring agent 70 to receive the deployed software module 200 and to gather statistics or metrics on the parameters chosen by a user or as indicated by the deployed software module 200 itself and will be able to communicate these statistics and metrics to any computer 10 having the monitoring module 300, as will be discussed. One of skill in the art will further understand that the Internet or any system, whether wired or wireless, is actually a broadband bus between computers.

Still yet, any of the components of the method and program products shown in the embodiments of FIG. 1 through FIG. 4 could be deployed, managed, serviced by a service provider who offers to perform one or more of: deploy the software module 200, acquire the metrics used by the metrics acquisition and comparison module 400, perform the comparison of the metrics acquisition and comparison module 400 or distribute the deployed software module 200.

Figure 2:
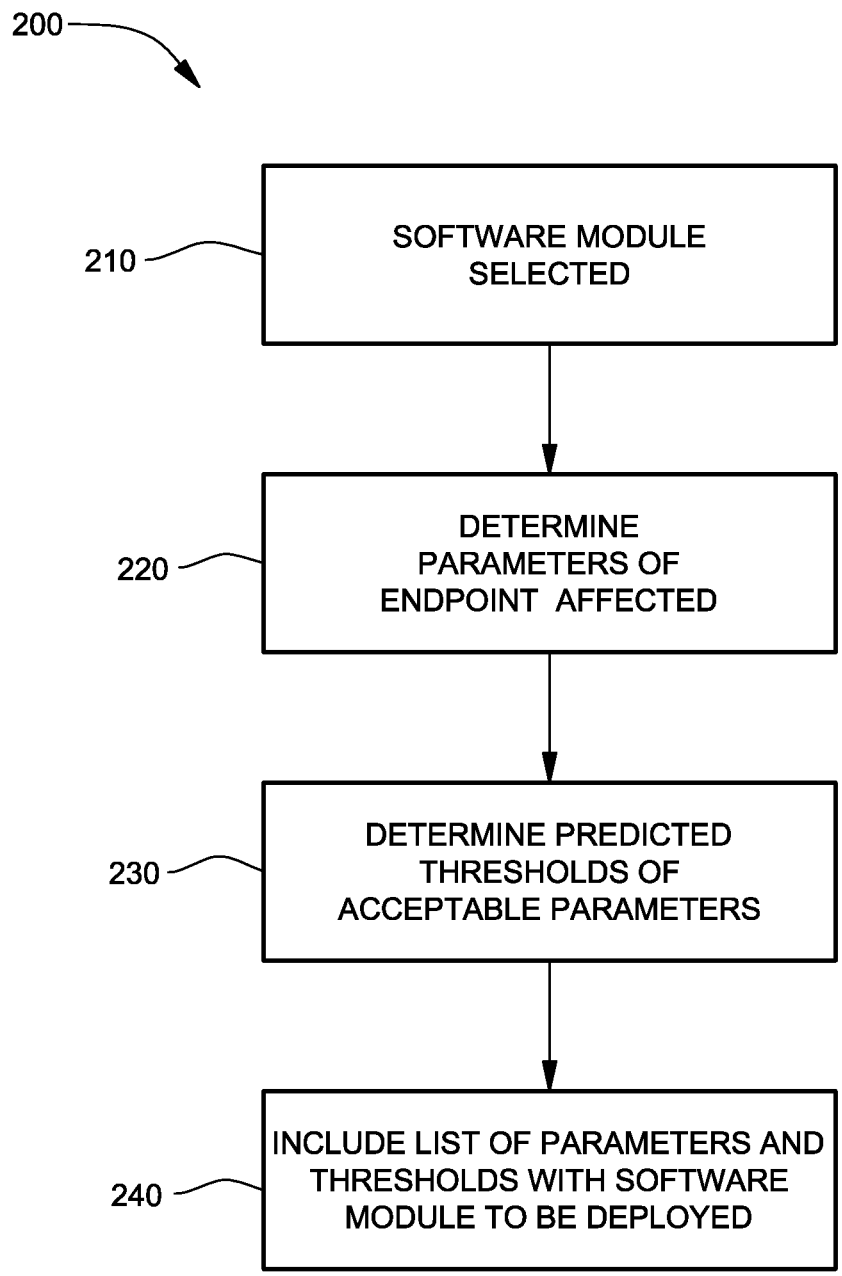
FIG. 2 is a simplified flow chart of the process steps by which parameters and thresholds of the deployed software module are included with the software module in accordance with an embodiment of the invention.

FIG. 2 is a flow chart of the process steps of determining the default parameters and their thresholds to be monitored of a deployed software module 200 at several installation stages discussed below. A list of the parameters and thresholds may be contained with a script or metadata transmitted with the software module 200. In step 210, a user or the author of the software module 200 selects the software module they want to modify. In step 220, they will prepare an inventory or a list of operation parameters that will or might be affected by the installation and execution of the software module 200 on the endpoint machines. In this manner, an operator can define the metrics she/he wants to monitor on an arbitrary set of systems. In step 230, they will prepare optimal or preferred threshold metrics associated with each of the parameters as determined in step 220. The list of parameters and acceptable thresholds will then be included as metadata or as a script as in step 240 that accompanies the transmitted software module 200. Examples of general parameters that may be affected are CPU usage, internal and/or external bus traffic, the amount of RAM memory or other storage used by the executing software module 20, etc. There may be other parameters associated with the particular software module 200. For example, if the software module 200 is an electronic mail application, one parameter may be the number of electronic messages transmitted per minute or second. For banking applications, some metrics might be the type and number of transactions per unit time or per machine. For electronic commerce applications, metrics may comprise the number of transactions per minute, whether the transactions were credit card transaction or electronic funds transfers, the impact of the transactions on inventory, etc. One of skill in the art will appreciate that every software module 200, once installed, will affect CPU performance, internal and external bus traffic, and memory. Specific software modules, moreover, have their own unique parameters to monitor and measure. Examples of thresholds may be that an average variance of ten percent over two hours for a given parameter is considered acceptable, a variance of twenty percent is considered suspect, and a variance of over thirty percent is considered a failure. The threshold percentages and the sampling time can all be tuned for the specific software module.

Figure 3:
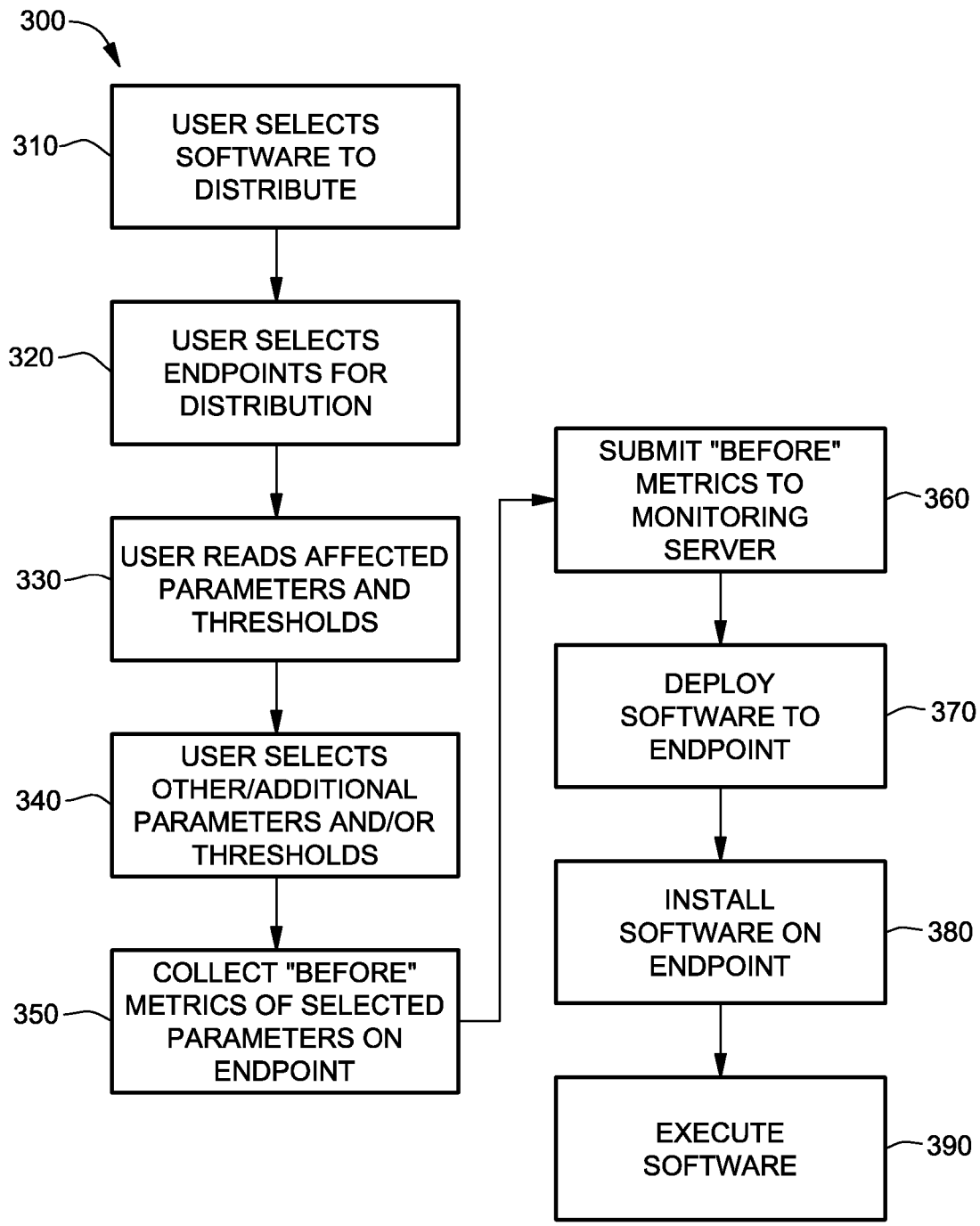
FIG. 3 is a simplified flow chart of the process steps by which the chosen parameters of the software module are measured before deployment of the software module in accordance with an embodiment of the invention.

FIG. 3 provides a simplified flow chart of the process steps by operating parameters affected by the installation and execution of the deployment software module 200 are selected and measurements of those operating parameters are taken before the deployment, installation, and execution of the software module 200 on the endpoint machines. In step 310, a user selects the software module 200 for distribution. In step 320, a user having access to the distribution server selects the endpoint machines for distribution or deployment of the software module 200. Typically, for a new deployment and installation and/or for a large program, deployment may be limited to a relatively few endpoint computers, such as those in a building or on a particular LAN. For software patches and updates, however, it is not unusual to distribute these software modules 200 to over fifty thousand or hundreds of thousands of endpoint machines.

In step 330, a user having access to the software module 200 or to the endpoint machines will review the list of predetermined operating parameters that may be affected and the acceptable thresholds or tolerances or expected values of those parameters that were determined by the process of FIG. 2. In a preferred embodiment, a user may also override those suggested parameters and thresholds/tolerances by deleting, adding or substituting her/his own input. The user, at step 340, may also select other criteria for collecting data on the parameters. For instance, depending upon the software module 200, a user or an application can select the time span to examine to determine the system's "good/current state," whether the execution be monitored for one hour, one day, one weeks, several months, etc. Another consideration is the time interval after the deployment and installation to monitor the execution parameters: which could be every ten minutes, every hour, every several hours, etc. after deployment. One of skill in the art of software deployment and installation understands that the effects of deployment, installation, and execution of a software module 200 may actually affect other programs or modules that may appear to be wholly unrelated to the new software module 200 and so a user may choose to monitor the activity of parameters of other software modules, other than the newly deployed software module 200. The software module 200 can easily affect the hardware, so choosing the hardware to monitor can be customizable, such as process utilization, sockets, queue depth, request/response time, etc. The tolerance that is deemed acceptable for each metric can also be customized by the user, e.g., CPU usage not more than 10% higher, response time +/− 0.5 microsecond, etc. The user's choices for the parameters, the thresholds/tolerances and other measurement criteria can be saved or persisted as a "template" for quick reuse.

In step 350, an agent 70 in the target endpoint machines will be requested to and will obtain the selected performance metrics relevant to the software module 200 to get a "before" measurement, i.e., the selected parameters will be measured in the endpoint machines prior to deployment of the software module 200. These "before" metrics may be stored on the endpoint machine or, optionally, at step 360, may be transmitted to the monitoring server. In a preferred embodiment, the request and the "before" metrics of the endpoint machines are transmitted before the deployment of the software to the endpoint machines because even deployment may affect the operation of the endpoint machines. In any event, the "before" metrics of each endpoint machine should be taken and even transmitted prior to installation and execution of the software module 200 on each endpoint machine. Then in step 370, the distribution server, upon acknowledgment that the monitoring server has received the "before" statistics, executes the deployment module 300 to deploy the software module 200 to the endpoint machine. In step 380, the software module 200 is installed on the selected endpoint machines. In step 390, the endpoint machines actually execute the installed software module 200. Optionally, the monitoring agent may collect metrics of the selected parameters at various stages of the software installation and execution, e.g., after deployment and/or before installation and/or during installation and/or after installation, and/or during execution of the software module 200. One of skill in the art will appreciate that this programmable feature may be necessary because while deployment may not affect the operating parameters, installation of the software may affect other operating parameters, such as through file sharing, etc. And then again, while deployment and installation of the software module 200 may not affect the operation of the endpoint machine, actual execution of the software module may affect the operations of the endpoint machines and other installed software.

Figure 4:
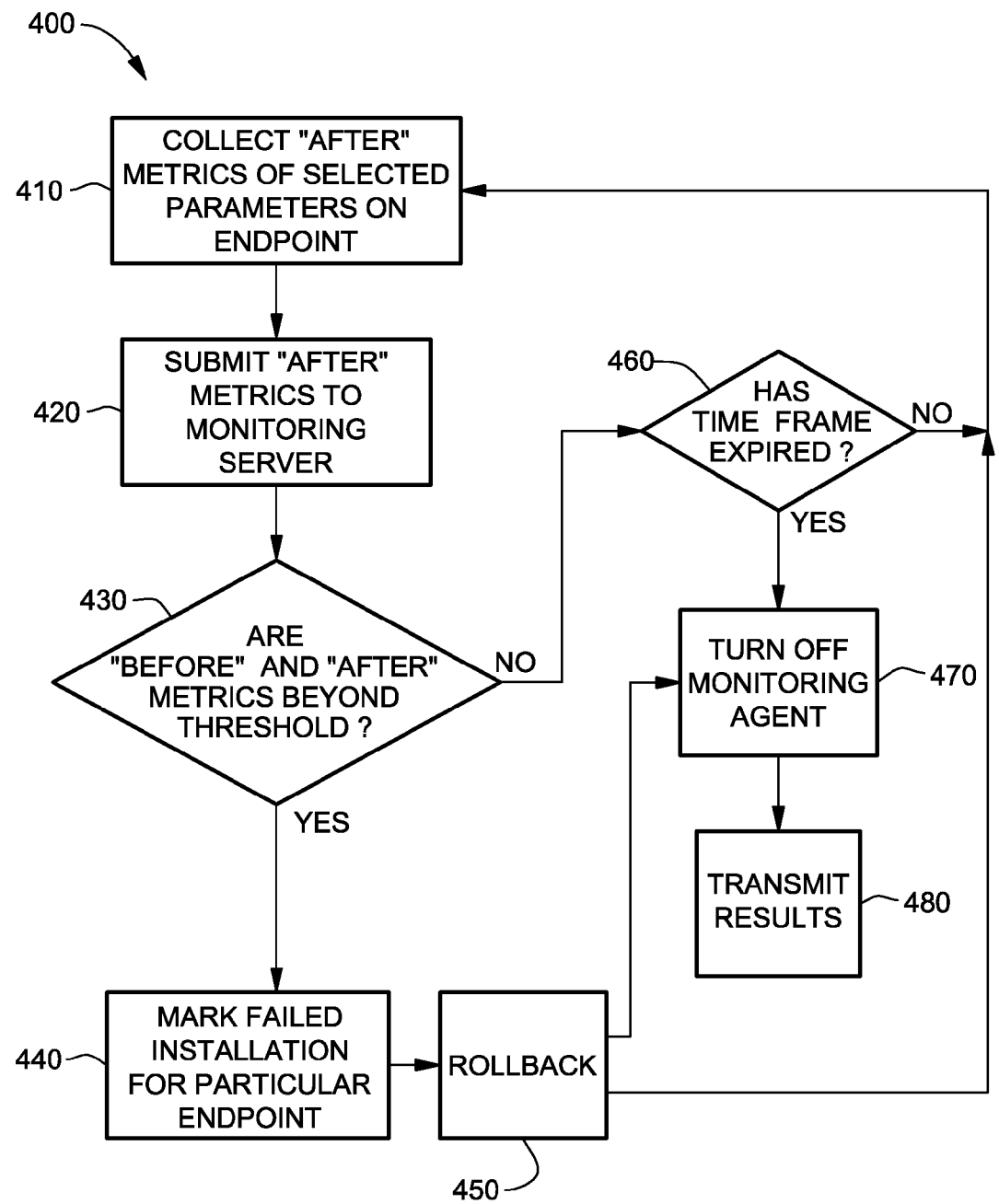
FIG. 4 is a simplified flow chart of the process steps by which the chosen parameters of the software module are measured after deployment and installation of the software module in accordance with an embodiment of the invention. It is suggested that FIG. 4 be printed on the face of the patent.

FIG. 4 is a simplified flow of the events or process steps of the monitor and compare software module 400 whose process and computer program steps occur after the software module 200 has been deployed, installed, and is executing on the endpoint machine. In step 410, monitoring begins and metrics are taken of the executing parameters that have been selected by the installed software module itself or by the user, such as CPU consumption, memory use or memory leakage, number of transactions, etc. In step 420, the "after" metrics may be stored or transmitted to a monitoring server. In a preferred embodiment, the monitoring server has IBM TIVOLI®. Monitoring (ITM) software or a similar monitoring software with the comparison or monitoring module 400 installed. In step 430, the monitoring server compares the "before" and "after" metrics and determines if any are beyond the thresholds, out of tolerance, or otherwise unusual. If not, then execution continues and the process may go to step 460 to determine if the time period for continued monitoring of the parameters has expired.

If, however, the "before" and "after" deployment and installation metrics are out of tolerance, then in step 440, the monitoring server may mark the particular endpoint machine as having experienced a failed installation of the software module 200. This marker may then be transmitted to the deployment server and to the endpoint machine itself. In step 450, if there is a failure, the deployment server, the endpoint machine, or the monitoring server may cause a "rollback" of the installation of the software module. A "rollback" essentially uninstalls the problematic software module and restores the endpoint machine to its executable configuration prior to the deployment and installation of the software module. When a system has not reached or has exceeded the optimal or defined thresholds, the deployed software itself or the monitoring software can cause events to be automatically generated, such as automatically invoking diagnosis or remediation tasks. The monitoring server can then send notifications to operators to inform them of problems or the monitoring server may run automation scripts to react to the problem, e.g., switch to a backup server, attempt to remedy the problem, reboot the system, etc. In one embodiment, if installation of a software module causes an endpoint machine to be out of tolerance, a user should be able to select the next step, such as a combination of: uninstall the software, run a command/script, send an event to an IBM's TIVOLI® Enterprise Console (TEC), send an email, flag the system as suspect, or if using a software distribution or release management product, such as IBM's TIVOLI® IT Service Management's (ITSM) Release Management, deem the release as not being successful, or even perform corrective actions on the appropriate server or endpoint machine to ensure successful deployment, installation, execution, etc.

In step 460, a query is made as to whether the time frame for monitoring execution of the software has expired. If yes, then the metrics are transmitted to the monitoring server and the monitoring module is turned off. Best practices require that, in step 480, the results of the monitoring module 400 be returned to interested users, such as the user of the endpoint machine, the monitoring server, the deployment server, etc. If the time frame has not expired, then the process returns to step 410.

Extra benefits of the deployed software module having an inventory of affected performance parameters and the monitoring module to monitor and compare the metrics of the executing performance parameters of the deployed module both before and after installation are realized. Real metrics and statistics can be observed for specific software packages during several deployment jobs. Based on the results, then recommendations can be provided on how best to configure the software module 200. File packages are improved by including metadata to provide recommendations on the tolerance of metrics, especially useful when it is known some metrics should be quite different, i.e., an upgrade or patch is supposed to improve all performance criteria by 40 percent, etc.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A computer implemented method for verifying deployment of software, the method comprising:

a computer receiving a selection, by a user, of a software module and of an endpoint machine, the endpoint machine being external to the computer;

the computer transmitting, to the endpoint machine, the software module together with and external to: (i) an identification of a performance parameter of the endpoint machine and (ii) a threshold range for a change in a value of a metric of the performance parameter;

the computer receiving a first measurement of the value of the metric before execution of the software module in the endpoint machine and a second measurement of the value of the metric during execution of the software module in the endpoint machine, the first measurement differing from the second measurement due to execution of the software module in the endpoint machine; and the computer ascertaining that the difference between the first measurement and the second measurement is outside of the threshold range indicating that execution of the software module on the endpoint machine degrades the performance parameter of the endpoint machine, and in response, the computer taking a corrective action to inhibit the change in the value of the metric of the performance parameter from being outside of the threshold range during execution of the software module in the endpoint machine.

2. The method of claim 1, wherein the transmitting comprises transmitting the software module together with and external to: (i) the identification of the performance parameter of the endpoint machine and (ii) the threshold range and an associated tolerance for the change in the value of a metric of the performance parameter; and wherein the ascertaining comprises ascertaining that the difference between the first measurement and the second measurement is outside of the threshold range by more than the tolerance.

3. The method of claim 1, wherein the performance parameter is selected from the group consisting of:
CPU usage of the endpoint machine during execution of the software module in the endpoint machine,
internal bus traffic in the endpoint machine during execution of the software module in the endpoint machine,
an amount of memory used by the software module in the endpoint machine during execution of the software module in the endpoint machine,
a rate of transmission of electronic mail messages by the endpoint machine during execution of the software module in the endpoint machine wherein the software module is an electronic mail application,
a rate of electronic fund transfers or a rate of credit card transactions performed by the endpoint machine during execution of the software module in the endpoint machine wherein the software module is an electronic commerce application, and
a rate of banking transactions performed by the endpoint machine during execution of the software module in the endpoint machine wherein the software module is a banking application.

4. A computer program product for verifying deployment of software, the computer program product comprising one or more computer readable memories and program instructions stored on at least one of the one or more storage devices, the program instructions comprising:
program instructions to receive, by a computer, a selection, by a user, of a software module and of an endpoint machine, the endpoint machine being external to the computer;
program instructions to transmit, by the computer, the software module together with and external to: (i) an identification of a performance parameter of the endpoint machine and (ii) a threshold range for a change in a value of a metric of the performance parameter;
program instructions to receive, by the computer, a first measurement of the value of the metric before execution of the software module in the endpoint machine and a second measurement of the value of the metric during execution of the software module in the endpoint machine, the first measurement differing from the second measurement due to execution of the software module in the endpoint machine; and
program instructions to ascertain, by the computer, that the difference between the first measurement and the second measurement is outside of the threshold range indicating that execution of the software module on the endpoint machine degrades the performance parameter of the endpoint machine, and in response, to take a corrective action, by the computer, to inhibit the change in the value of the metric of the performance parameter from being outside of the threshold range during execution of the software module in the endpoint machine.

5. The computer program product of claim 4,
wherein the program instructions to transmit comprises program instructions to transmit the software module together with and external to: (i) the identification of the performance parameter of the endpoint machine and (ii) the threshold range and an associated tolerance for the change in the value of a metric of the performance parameter; and wherein the program instructions to ascertain comprises program instructions to ascertain that the difference between the first measurement and the second measurement is outside of the threshold range by more than the tolerance.

6. The computer program product of claim 4, wherein the performance parameter is selected from the group consisting of:
CPU usage of the endpoint machine during execution of the software module in the endpoint machine,
internal bus traffic in the endpoint machine during execution of the software module in the endpoint machine,
an amount of memory used by the software module in the endpoint machine during execution of the software module in the endpoint machine,
a rate of transmission of electronic mail messages by the endpoint machine during execution of the software module in the endpoint machine wherein the software module is an electronic mail application,
a rate of electronic fund transfers or a rate of credit card transactions performed by the endpoint machine during execution of the software module in the endpoint machine wherein the software module is an electronic commerce application, and
a rate of banking transactions performed by the endpoint machine during execution of the software module in the endpoint machine wherein the software module is a banking application.

7. A computer system for verifying deployment of software, the computer system comprising one or more processors, one or more computer-readable memories, one or more computer-readable storage devices, and program instructions stored on at least one of the one or more storage devices for execution by at least one of the one or more processors via at least one of the one or more memories, the program instructions comprising:
program instructions to receive, by a computer, a selection, by a user, of a software module and of an endpoint machine, the endpoint machine being external to the computer;
program instructions to transmit, by the computer, the software module together with and external to: (i) an identification of a performance parameter of the endpoint machine and (ii) a threshold range for a change in a value of a metric of the performance parameter;
program instructions to receive, by the computer, a first measurement of the value of the metric before execution of the software module in the endpoint machine and a second measurement of the value of the metric during execution of the software module in the endpoint machine, the first measurement differing from the second measurement due to execution of the software module in the endpoint machine; and
program instructions to ascertain, by the computer, that the difference between the first measurement and the second measurement is outside of the threshold range indicating that execution of the software module on the endpoint machine degrades the performance parameter of the endpoint machine, and in response, to take a corrective action, by the computer, to inhibit the change in the value of the metric of the performance parameter from being outside of the threshold range during execution of the software module in the endpoint machine.

8. The computer system of claim 7,
wherein the program instructions to transmit comprises program instructions to transmit the software module together with and external to: (i) the identification of the performance parameter of the endpoint machine and (ii) the threshold range and an associated tolerance for the change in the value of a metric of the performance parameter; and
wherein the program instructions to ascertain comprises program instructions to ascertain that the difference between the first measurement and the second measurement is outside of the threshold range by more than the tolerance.

9. The computer system of claim 7, wherein the performance parameter is selected from the group consisting of:
CPU usage of the endpoint machine during execution of the software module in the endpoint machine,
internal bus traffic in the endpoint machine during execution of the software module in the endpoint machine,
an amount of memory used by the software module in the endpoint machine during execution of the software module in the endpoint machine,
a rate of transmission of electronic mail messages by the endpoint machine during execution of the software module in the endpoint machine wherein the software module is an electronic mail application,
a rate of electronic fund transfers or a rate of credit card transactions performed by the endpoint machine during execution of the software module in the endpoint machine wherein the software module is an electronic commerce application, and
a rate of banking transactions performed by the endpoint machine during execution of the software module in the endpoint machine wherein the software module is a banking application.

\* \* \* \* \*